J. R. REYBURN.
CHAIN NONSKID UNIT.
APPLICATION FILED MAY 8, 1917. RENEWED MAR. 24, 1922.

1,416,382.

Patented May 16, 1922.

Inventor
John R Reyburn
By his Attorney
Harry L Duncan

UNITED STATES PATENT OFFICE.

JOHN R. REYBURN, OF FAIRFIELD, CONNECTICUT, ASSIGNOR TO AMERICAN CHAIN COMPANY, INCORPORATED, OF BRIDGEPORT, CONNECTICUT, A CORPORATION OF NEW YORK.

CHAIN NONSKID UNIT.

1,416,382.  Specification of Letters Patent.  Patented May 16, 1922.

Application filed May 8, 1917, Serial No. 167,166. Renewed March 24, 1922. Serial No. 546,517.

*To all whom it may concern:*

Be it known that I, JOHN R. REYBURN, a citizen of the United States, and resident of Fairfield, Fairfield County, State of Connecticut, have made a certain new and useful invention relating to Chain Nonskid Units, of which the following is a specification, taken in connection with the accompanying drawing, which forms part of the same.

This invention relates especially to chain non-skid devices or units adapted for use on motor trucks or other vehicles in which a tread chain which may be formed of heavy curbed links to give the desired traction is detachably arranged around the tire and felly and held in place by an attached spoke chain adapted to encircle the spoke or other securing device. These two chains may be detachably connected by an L-shaped hook connector preferably having a locking end extending into the angular hook so as to form a relatively narrow retaining loop in which the inserted links of the tread chain and spoke chain may be held and this locking end of the connector may extend sufficiently close to its shank to form a constricted throat or passage through which the links may be passed in assembling the device, which minimizes the possibility of accidental release of the parts.

In the accompanying drawing showing in a somewhat diagrammatic way illustrative embodiments of the invention, Fig. 1 is a sectional view showing the device arranged on the tire, parts being broken away for greater clearness.

Figure 1:
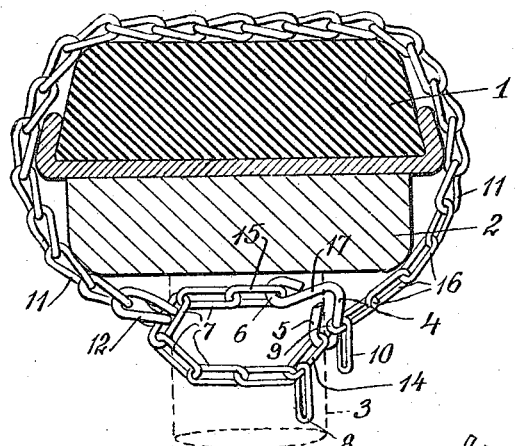
Figure 2:
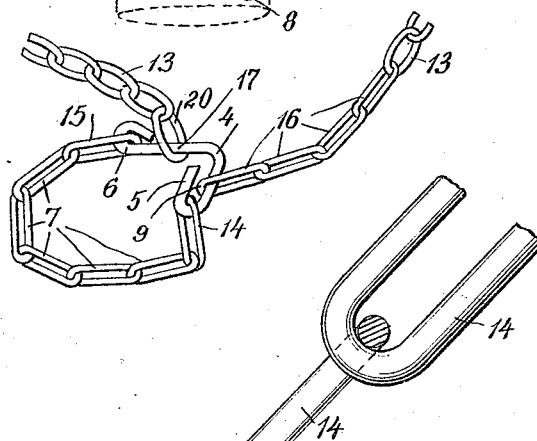
Fig. 2 is a view showing a portion of a modified arrangement.

The spoke chain may be formed of links of any suitable size and shape, such as 7, one of these links 15 being, if desired, permanently secured to the eye 6 of the connector device 17, while one of the terminal links, such as 8 or 14, is adapted to disengageably cooperate with this hook connector when the spoke chain encircles a wheel member, such as the spoke 3, in assembling the device. The cooperating tread chain adapted to extend around the tire tread 1 and felly 2 may be formed of any suitable links or members, such as the rather heavy curbed links 11 which may be of special alloy or hardened steel to give the desired toughness and wearing qualities, and if desired, suitable connecting links, such as 16, may be provided to detachably engage the connector 17 and allow for adjustment to suit tires of different size, since any one of these links may engage the connector and allow one or more end links, such as 10, to hang idle in case of a relatively small tire. If desired, the tread chain may be permanently secured to the spoke chain as by an attaching link 12 having double end hooks locking through a side member of one of the spoke chain links preferably adjacent the middle of this spoke chain, so that the spoke chain and tread chain are thus permanently and definitely united at a fixed point. It is, of course, understood that a looser connection may be provided between these parts and for this purpose an attaching link, such as 20, may be formed on the tread chain to encircle the spoke chain or connector, as shown in Fig 2, and allow the convenient disengagement of these parts and thus facilitate replacements. Under service conditions this attaching link 20 would naturally work around the spoke chain so as to be substantially opposite the connector.

Figure 3:
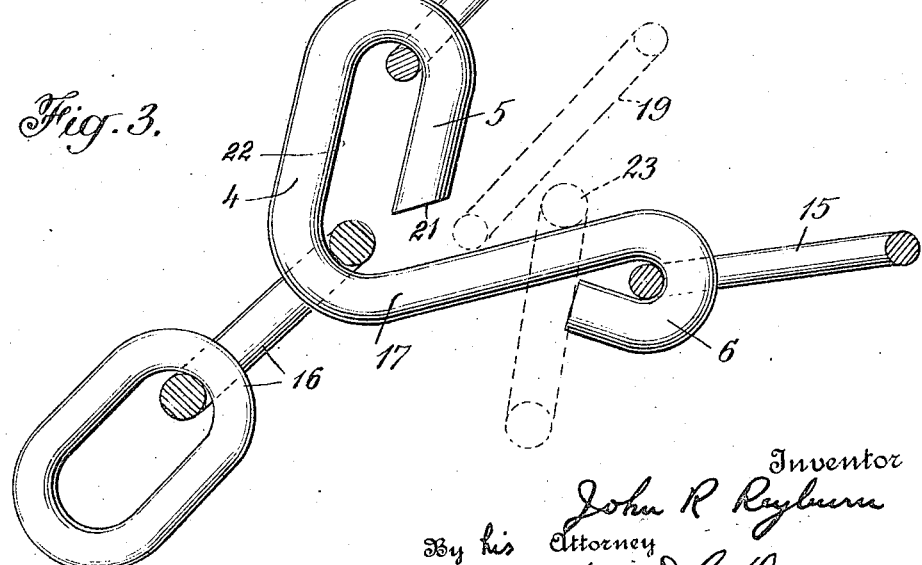
Fig. 3 is an enlarged view showing the connector and cooperating parts.

The connector device may as indicated in greater detail in Fig. 3 comprise a suitable securing member, such as the eye 6, which may be formed integral with the shank of the connector and bent around or secured to any other suitable chain link of the device, such as one of the links of the spoke chain so as to permanently secure the connector thereto and as indicated the connector may thus be secured to the end link 15 of the spoke chain. The connector may, if desired, be in the form of an L-shaped hook having the hook member 4 extending preferably at a somewhat oblique angle so as to be bent back toward the shank of the connector and it is desirable to form thereon a retaining loop, such as 22, in the connector so that it extends into the angular hook between the other members. The tip of this locking end may, if desired, extend relatively close to the shank of the connector and be cut off practically parallel thereto so as to form a constricted throat or passage at 21 through which the links may pass in assembling the device and which tends to minimize their accidental withdrawal from the retaining loop 22. This retaining loop is preferably formed sufficiently narrow so that the links of the tread chain and spoke chain inserted therein cannot pass each other in this loop and thus the last link inserted must be the first to be withdrawn and can thus act as a locking device to prevent the premature or accidental withdrawal or disengagement of the other link. It is usually desirable to have the tread chain link act as a locking or retaining member in this way, and if desired, this link 16 may be formed of somewhat larger diameter than the end or securing links 14 of the spoke chain. It also contributes to the reliability of the device to assemble the links and connector by passing the desired link of the tread chain around the connector hook at its locking end so that this link then assumes about the dotted position 23. Then the desired link of the spoke chain may be inserted through the constricted throat passage of the connector at 21 then assumes about the dotted position 19 and when this link, such as 14, has entered the retaining loop the tread chain link 16 may pass through the throat after which it will naturally remain within this retaining loop and effectively block the withdrawal of the spoke chain link therefrom. The device can thus be readily assembled on a tire and easily removed when desired without the aid of special tools or tightening devices, the parts being still more effective because of such simple and strong and reliable construction. It somewhat facilitates manufacture and compactness to form the retainer with all its members or parts substantially in a single plane, although this is not of course necessary in all cases.

This invention has been described in connection with a number of illustrative embodiments, forms, arrangements, parts, proportions and materials and methods of use, to the details of which disclosure the invention is not of course to be limited, but what is claimed as new and what is desired to be secured by Letters Patent is set forth in the appended claims.

1. The chain non-skid unit comprising a spoke chain and a tread chain permanently connected to said spoke chain adjacent its middle portion and comprising tread links to cooperate with the tire and an L-shaped hook connector formed with an eye permanently secured to the end of said spoke chain and having a hook member bent back into angular position toward the shank of said connector and having a locking end bent into the angular hook member of the connector to form a substantially parallel sided retaining loop adjacent said hook member and a substantially parallel sided constricted passage adjacent the shank of said connector, the end connecting links of said tread chain being of such size as to prevent accidental withdrawal of the spoke chain links past them through said retaining loop and constricted passage.

2. The chain non-skid unit comprising a spoke chain and a tread chain permanently connected to said spoke chain and comprising tread links to cooperate with the tire and an L-shaped hook connector permanently secured to the end of said spoke chain and having a hook member bent back into angular position toward the shank of said connector and having a locking end bent into the angular hook member of the connector to form a substantially parallel sided retaining loop adjacent said hook member and a constricted passage adjacent the shank of said connector.

3. The chain non-skid unit comprising a spoke chain and a tread chain permanently connected to said spoke chain and comprising tread links to cooperate with the tire and an L-shaped hook connector permanently secured to the end of said spoke chain and having a hook member and a locking end bent into the angular hook member of the connector to form a retaining loop adjacent said hook member.

4. The chain non-skid unit comprising a spoke chain and a connector tread chain to cooperate with the tire and an L-shaped hook connector secured to one of said chains and having a hook member bent back into angular position toward the shank of said connector and having a locking end bent into the angular hook member of the connector to form a substantially parallel sided retaining loop adjacent said hook member and a substantially parallel sided constricted passage adjacent the shank of said connector, the end conecting links of one of said chains being of such size as to substantially block the space within the said loop and prevent accidental withdrawal of the link of the other chain through said retaining loop and constricted passage.

5. The chain non-skid unit comprising a spoke chain and a connected tread chain to cooperate with the tire and an L-shaped hook connector secured to one of said chains and having a hook member and a locking end bent into the hook member of the connector to form a retaining loop adjacent said hook member and a substantially parallel sided constricted passage adjacent the shank of said connector, the end connecting links of one of said chains being of such size as to prevent accidental withdrawal of the link of the other chain through said retaining loop and constricted passage.

6. The chain non-skid unit comprising a spoke chain and a connected tread chain to cooperate with the tire and an L-shaped hook connector secured to one of said chains and having a hook member and a locking end bent into the hook member of the connector to form a retaining loop adjacent said hook member and a constricted passage adjacent the shank of said connector.

7. The combination with a vehicle wheel and tire of a chain non-skid unit comprising a spoke chain encircling a spoke and a tread chain encircling the tire and felly and connected to said spoke chain adjacent its central portion and an L-shaped hook connector formed with an eye permanently secured to the end of said spoke chain and having a bent back hook member formed with a narrow retaining loop and passage adjacent the shank of the connector, an end securing link of said spoke chain being inserted in said retaining loop and held therein by the subsequently inserted end securing link of said tread chain preventing accidental withdrawal of said supporting chain link.

8. The combination with a vehicle wheel of a chain non-skid unit comprising a spoke chain encircling a spoke and a tread chain encircling the tire and felly and connected to said spoke chain and an L-shaped hook connector permanently secured to the end of said spoke chain and having a hook member formed with a narrow retaining loop and passage adjacent the shank of the connector, an end securing link of said spoke chain being inserted in said retaining loop and held therein by the subsequently inserted end securing link of said tread chain preventing accidental withdrawal of said supporting chain link.

9. In an anti-skid device, a chain to surround a spoke, a separate tread member, and means, common to the spoke chain and tread member, to secure the ends of the spoke chain and the ends of the tread member together.

10. The chain non-skid unit comprising a spoke chain and a tread chain permanently connected to said spoke chain and comprising tread links to cooperate with the tire and a hook connector permanently secured to the end of said spoke chain and having a hook member and a locking end bent into the angular hook member of the connector to form a retaining loop adjacent said hook member.

11. The chain non-skid unit comprising a spoke chain and a connected tread chain to cooperate with the tire and a hook connector secured to one of said chains and having a hook member and a locking end bent into the hook member of the connector to form a retaining loop adjacent said hook member and a constricted passage adjacent the shank of said connector.

JOHN R. REYBURN.

Witnesses:
   RAYMOND L. BROWN,
   WALTER F. FITZGERALD.